(12) United States Patent
Walker et al.

(10) Patent No.: US 10,782,192 B2
(45) Date of Patent: Sep. 22, 2020

(54) CALIBRATION BATH WITH STIR MOTOR CLOSED-LOOP CONTROL AND STIRRING VISCOSITY DETECTION AND ADJUSTMENT

(71) Applicant: Fluke Corporation, Everett, WA (US)

(72) Inventors: Richard W. Walker, Alpine, UT (US);
Michael W. Hirst, Lindon, UT (US);
Eric Nerdrum, Kaysville, UT (US)

(73) Assignee: Fluke Corporation, Everett, WA (US)

( * ) Notice: Subject to any disclaimer, the term of this patent is extended or adjusted under 35 U.S.C. 154(b) by 613 days.

(21) Appl. No.: 15/465,113

(22) Filed: Mar. 21, 2017

(65) Prior Publication Data
US 2018/0274993 A1    Sep. 27, 2018

(51) Int. Cl.
G01K 19/00    (2006.01)
G01K 15/00    (2006.01)
G01N 11/14    (2006.01)

(52) U.S. Cl.
CPC ......... *G01K 15/002* (2013.01); *G01K 15/007* (2013.01); *G01N 11/14* (2013.01)

(58) Field of Classification Search
CPC combination set(s) only.
See application file for complete search history.

(56) References Cited

U.S. PATENT DOCUMENTS

| | | | |
|---|---|---|---|
| 4,379,775 A | 4/1983 | Brandstetr et al. | |
| 5,768,728 A * | 6/1998 | Harwood | D06F 39/003 8/158 |
| 2005/0239199 A1 | 10/2005 | Kunas et al. | |
| 2006/0064257 A1 | 3/2006 | Pennington et al. | |
| 2006/0244407 A1 | 11/2006 | Lawrence et al. | |
| 2007/0156289 A1 | 7/2007 | Altieri et al. | |

(Continued)

FOREIGN PATENT DOCUMENTS

| CN | 203274963 U | 11/2013 |
|---|---|---|
| CN | 105651421 A | 6/2016 |

(Continued)

OTHER PUBLICATIONS

Extended European Search Report dated Aug. 14, 2018, for European Application No. 18163198.7, 10 pages.

(Continued)

*Primary Examiner* — Lisa M Caputo
*Assistant Examiner* — Nasir U. Ahmed
(74) *Attorney, Agent, or Firm* — Seed Intellectual Property Law Group LLP

(57) ABSTRACT

A calibration device includes a tank, a propeller disposed within the tank, a motor coupled to the propeller, a processor coupled to the motor, and a memory. The memory stores instructions that, when executed by the processor, cause the motor to rotate at a specified speed based on input an indication of an actual speed of the motor. The memory may store instructions that cause the device to dynamically change the speed of the motor based on the viscosity of a fluid in the tank, which changes as the temperature of the fluid changes. In addition, the memory may store instructions that cause the device to determine whether the fluid in the tank is deteriorated, and to provide an operator alert in response to determining that the fluid is deteriorated.

18 Claims, 9 Drawing Sheets

(56) References Cited

U.S. PATENT DOCUMENTS

| | | | |
|---|---|---|---|
| 2009/0133429 A1* | 5/2009 | Petersen | ............... A23G 9/222 |
| | | | 62/342 |
| 2010/0100075 A1* | 4/2010 | Weston | ............... A61M 1/0031 |
| | | | 604/543 |
| 2013/0148687 A1 | 6/2013 | Sjogren et al. | |
| 2013/0149710 A1 | 6/2013 | Yoon et al. | |
| 2013/0190159 A1* | 7/2013 | Watahiki | ................. B04B 13/00 |
| | | | 494/11 |
| 2014/0267805 A1 | 9/2014 | Webb | |

FOREIGN PATENT DOCUMENTS

| | | |
|---|---|---|
| EP | 1 837 640 A2 | 9/2007 |
| JP | 60-172592 U | 11/1985 |
| JP | 8-247861 A | 9/1996 |

OTHER PUBLICATIONS

U.S. Appl. No. 15/465,055, filed Mar. 21, 2017, Rapid Cooling Device and Method for a Calibration Bath.
U.S. Appl. No. 15/465,105, filed Mar. 21, 2017, Device Having Tank Shaped to Produce Flow Direction and Improve Temperature Stability and Uniformity.
Fluke Corporation, Hart Scientific Division, "7013 Calibration Bath User's Guide," Rev. 682804, 2005, 83 pages.
Extended European Search Report, dated Jul. 20, 2018, for European Application No. 18163197.9-1001, 8 pages.
Extended European Search Report, dated Jul. 20, 2018, for European Application No. 18162926.2-1009, 9 pages.
Fluke Corporation, Hart Scientific Division, "Field Metrology Wells," Technical Data, Mar. 11, 2010, 6 pages.

* cited by examiner

CALIBRATION BATH WITH STIR MOTOR CLOSED-LOOP CONTROL AND STIRRING VISCOSITY DETECTION AND ADJUSTMENT

BACKGROUND

Technical Field

The present disclosure relates to temperature regulation, and more particularly to regulation of the temperature of fluids used in calibration bath devices.

Description of the Related Art

Calibration baths use a volume of fluid to provide a constant temperature environment for calibrating thermal devices, such as temperature sensors and digital thermometers, for example. Because the temperature of the fluid is critical to accurately calibrating such devices, insulating materials and other means are used to reduce the impact of ambient conditions on the temperature of the fluid.

In calibration baths, heaters can be used to increase the temperature of a working volume of fluid to a desired temperature at which calibration of thermal devices is to be performed. These baths are not usually equipped with a cooling system to decrease the temperature of the working volume of fluid. Instead, when an operator wishes to decrease the temperature of the working volume of fluid, the operator simply switches off the heat source and allows ambient conditions to remove heat from the working volume of fluid, which can take a considerable amount of time. For example, if a working volume of fluid in a calibration bath is heated to a temperature that is several degrees higher than a desired temperature at which calibration of thermal devices is to be performed, it can take several minutes for ambient conditions to cool the fluid to the desired temperature, depending on the actual ambient conditions. By way of another example, it can take several hours to cool a working volume of fluid from 250° C. to 35° C. using a conventional calibration bath.

Calibration baths can be portable and moved to perform calibration of thermal devices at a variety of locations. It may be desirable to quickly cool a fluid in a portable calibration bath before moving the calibration bath, so that it can be moved safely without the risk of hot fluid spilling and causing severe burns to an operator, for example.

High-temperature calibration baths often use silicone oils as fluid media. Silicone oils degrade rapidly at temperatures above their oxidation temperature. Silicone oils are expensive. Accordingly, it may be desirable to quickly cool such oils to a temperature that is below their oxidation temperature after calibration of thermal devices is performed, to extend the useful life of the oils.

Vapor compression refrigeration systems and external cooling from chillers can be used to speed up cooling of working volumes of fluids in high-temperature calibration baths; however, vapor compression refrigeration systems limit the high end of a calibration bath's temperature range due to limits of a refrigerant's temperature range, and limits of a lubricating oil that travels throughout the plumbing of such systems. For example, the high end of a calibration bath's temperature range that uses a vapor compression refrigeration system may be limited to 170° C. In addition, compressors and refrigerants used in such systems can be damaged when return gas temperatures are sufficiently high to damage exhaust valves therein, for example. Chillers that externally cool working volumes of fluids in calibration baths have the same problems.

Thermo-electric modules (TEMs) also can be used to speed up cooling of working volumes of fluids in calibration baths. However, TEMs may be damaged when subjected to high temperatures and thus limit the high end of a calibration bath's temperature range.

In addition, coils through which compressed air or a liquid is circulated have been used as accessories to speed up cooling of working volumes of fluids in high-temperature calibration baths. Such coils can be expensive and dangerous. For example, if tap water is circulated through such a coil, dangerously high pressures can result if the temperature of a working volume of fluid is sufficiently high to cause the water to boil.

BRIEF SUMMARY

A device may be summarized as including a tank; a propeller disposed within the tank; a motor coupled to the propeller; a processor coupled to the motor; and a memory storing instructions that, when executed by the processor, cause the motor to rotate at a specified speed based on an indication of an actual speed of the motor. The memory may store instructions that, when executed by the processor, cause the device to: obtain an indication of a first temperature of a fluid in the tank; obtain a first viscosity value based on the first temperature of the fluid; obtain a first power level value based on the first viscosity value; and generate a first control signal based on the first power level value, the first control signal being supplied to the motor. The memory may store instructions that, when executed by the processor, cause the device to: obtain an indication of a fluid type of the fluid; and obtain the first viscosity value based on the fluid type and the first temperature of the fluid. The memory may store instructions that, when executed by the processor, cause the device to: obtain an indication of a second temperature of the fluid; obtain a second viscosity value based on the second temperature of the fluid; obtain a second power level value based on the second viscosity value; and generate a second control signal based on the second power level value, the second control signal being supplied to the motor. The memory may store instructions that, when executed by the processor, cause the device to: obtain an indication of a fluid type of the fluid; obtain the first viscosity value based on the fluid type and the first temperature of the fluid; and obtain the second viscosity value based on the fluid type and the second temperature of the fluid. The memory may store instructions that, when executed by the processor, cause the device to: obtain an indication of an actual speed at which the motor is rotating; obtain a power level value based on the actual speed at which the propeller is rotating; and generate a control signal based on the power level value, the control signal being supplied to the motor.

The memory may store instructions that, when executed by the processor, cause the device to: obtain a first viscosity value; obtain a second viscosity value based on a power level value associated with a control signal that is provided to the motor; compare the first viscosity value and the second viscosity value; determine that the fluid is deteriorated based on a result of comparing the first viscosity value and the second viscosity value; and provide an operator alert in response to determining that the fluid is deteriorated. The memory may store instructions that, when executed by the processor, cause the device to provide the operator alert by causing the device to at least one of: emit sound; display a message; transmit a message from the device; and store an error code in the memory. The memory may store instructions that, when executed by the processor, cause the device to, in response to determining that the fluid is deteriorated, at least partially disable the device until an indication that the fluid has been replaced is received. The memory may store instructions that, when executed by the processor, cause the device to: obtain an indication of a temperature of the fluid; obtain an indication of a fluid type of the fluid; and obtain the first viscosity value based on the temperature and the fluid type of the fluid. The memory may store instructions that, when executed by the processor, cause the device to: obtain an indication of a desired depth of a fluid in the tank; obtain a power level value based on the desired depth of the fluid in the tank; and generate a control signal based on the power level value, the control signal being supplied to the motor.

A method may be summarized as including obtaining an indication of a first temperature of a fluid disposed within a tank; obtaining a first power level value based on the first temperature of the fluid disposed within the tank; generating a first control signal based on the first power level value; providing the first control signal to a motor that is coupled to a propeller disposed within the tank, the first control signal causing the motor to rotate at a first speed; obtaining an indication of a second temperature of the fluid disposed within the tank; obtaining a second power level value based on the second temperature of the fluid disposed within the tank; generating a second control signal based on the second power level value; and providing the second control signal to the motor, the second control signal causing the motor to rotate at a second speed, the second speed being different from the first speed.

The method may include obtaining a first viscosity value based on the first temperature of the fluid; and obtaining a second viscosity value based on the second temperature of the fluid, wherein the obtaining of the first power level value includes obtaining the first power level value based on the first temperature of the fluid and the first viscosity value, and wherein the obtaining of the second power level value includes obtaining the second power level value based on the second temperature of the fluid and the second viscosity value.

The method may include obtaining an indication of a fluid type of the fluid, wherein the obtaining of the first viscosity includes obtaining the first viscosity value based on the first temperature and the fluid type of the fluid, and wherein the obtaining of the second viscosity includes obtaining the second viscosity value based on the second temperature and the fluid type of the fluid.

The method may include obtaining a first indication of a first speed at which the motor is rotating; and obtaining a second indication of a second speed at which the motor is rotating. The obtaining of the first power level value may be based on the first speed at which the propeller is rotating and the first temperature of the fluid disposed within the tank. The obtaining of the second power level value may be based on the second speed at which the propeller is rotating and the second temperature of the fluid disposed within the tank.

The method may include obtaining a first viscosity value; obtaining a second viscosity value based on the second power level value; comparing the first viscosity value and the second viscosity value; determining that the fluid is deteriorated based on a result of the comparing of the first viscosity value and the second viscosity value; and providing an operator alert in response to determining that the fluid is deteriorated. Providing the operator alert may include emitting light; emitting sound; displaying a message; transmitting a message from the device; and storing an error code in a memory. The method may include obtaining an indication of a fluid type of the fluid, and the obtaining of the first viscosity value may include obtaining the first viscosity value based on the fluid type. The method may include, in response to determining that the fluid is deteriorated, at least partially disabling the device until an indication that the fluid has been replaced is received.

The method may further include obtaining an indication of a desired depth of a fluid in the tank, wherein the obtaining the of first power level value includes obtaining the first power level value based on the first temperature of the fluid and the desired depth of the fluid in the tank.

DETAILED DESCRIPTION

Figure 1:
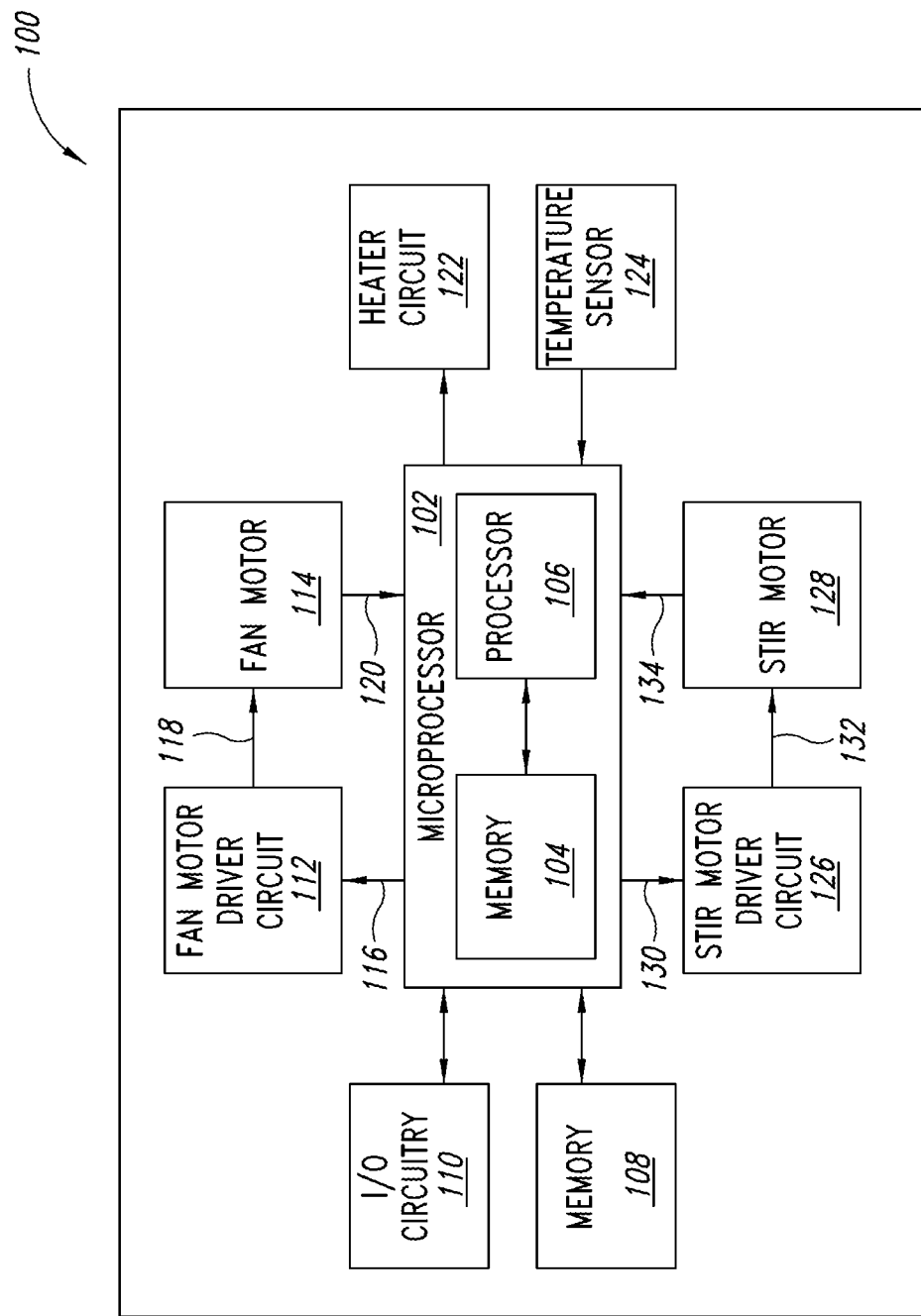
FIG. 1 is a block diagram of a calibration device, according to one or more embodiments of the present disclosure.

FIG. 1 is a block diagram of a calibration device 100, according to one or more embodiments of the present disclosure. The calibration device 100 includes a microprocessor 102 having a memory 104 and a processor 106. The calibration device 100 also includes a memory 108 that is coupled to the microprocessor 102. In one or more embodiments, the memory 104 is comprised of one or more conventional Random Access Memory (RAM) modules. In one or more embodiments, the memory 108 is comprised of one or more conventional Electronically Erasable Programmable Read Only Memory (EEPROM) modules. As will be explained in detail below, the memory 108 stores instructions that, when executed by the processor 106, cause the calibration device 100 to perform the functions described below. In one or more embodiments, the processor 106 uses the memory 104 as a working memory as the processor 106 executes the instructions that are stored by the memory 108.

The calibration device 100 also includes input/output (I/O) circuitry 110. In one or more embodiments, the I/O circuitry 110 includes input devices such as a touch input device, buttons, knobs, and/or dials, for example, that an operator can use to control operation of the calibration device 100. Additionally, in one or more embodiments, the I/O circuitry 110 includes one or more output devices such as a display device (e.g., liquid crystal display), light emitting devices, speakers, a buzzer, and/or data interfaces (e.g., Universal Serial Bus (USB) interfaces), for example.

The calibration device 100 also includes a fan motor driver circuit 112 that is electrically coupled to a fan motor 114 and the microprocessor 102. The microprocessor 102 controls a speed at which the fan motor 114 rotates by providing a control signal 116 to the fan motor driver circuit 112, which provides a corresponding control signal 118 to the fan motor 114. In one or more embodiments, the control signals 116 and 118 are pulse width modulated power signals that cause the fan motor 114 to operate at a variety of speeds, depending on a duty cycle of the control signal 116 and a duty cycle of the control signal 118. The duty cycle of each of the control signals 116 and 118 is a ratio of "on" time to a predetermined period of time corresponding to one cycle. In one or more embodiments, the microprocessor 102 generates the control signal 116 based on an amount of cooling required, in accordance with a program stored by the memory 108. In one or more embodiments, the fan motor driver circuit 112 generates the control signal 118 by amplifying the control signal 116 to provide higher current and voltage that is required by the fan motor 114. In one or more embodiments, the control signals 116 and 118 have the same duty cycle. In one or more embodiments, the fan motor 114 provides to the microprocessor 102 a signal 120 indicating the actual speed at which the fan motor 114 is rotating.

The calibration device 100 also includes a heater circuit 122 and one or more temperature sensors 124. In one or more embodiments, the heater circuit 122 includes one or more resistive heaters that produce heat in response to a current flowing therethrough. The heat from the resistive heaters of the heater circuit 122 is transferred to a first fluid that is circulated within a coil. The coil is disposed within a tank 160 near a propeller 172, for example, above the propeller 172 (see FIG. 3). The propeller 172 circulates a second fluid that has been heated by the coil to maintain the second fluid at a constant temperature that is uniformly distributed throughout the tank 160.

The microprocessor 102 provides a control signal to the heater circuit 122 based on a signal received from the one or more temperature sensors 124. For example, if the memory 104 of the microprocessor 102 stores information indicating that a desired temperature is 250° C. and the microprocessor 102 receives from a temperature sensor 124 a signal indicating that a temperature sensed by the temperature sensor 124 is 225° C., the microprocessor 102 provides a control signal to the heater circuit 122 that causes the heater circuit 122 to produce a relatively high amount of heat. Subsequently, if the microprocessor 102 receives from a temperature sensor 124 a signal indicating that a temperature sensed by the temperature sensor 124 is 255° F., the microprocessor 102 provides a control signal to the heater circuit 122 that causes the heater circuit 122 to produce less heat, or no heat.

In one or more embodiments, the microprocessor 102 controls the fan motor 114 based on a state of the heater circuit 122 and/or a sensed temperature of the tank 160. For example, while the microprocessor 102 controls the heater circuit 122 to be in a state in which it generates a relatively high amount of heat, the microprocessor 102 controls the fan motor 114 to be in an off state. Once a fluid within the tank 160 is heated to a desired temperature by the heater circuit 122, the microprocessor 102 controls the heater circuit 122 to be in a state in which it generates less heat. If a current temperature of the fluid within the tank 160 is greater than a desired temperature by a first predetermined amount, the microprocessor 102 controls the fan motor 114 to rotate at a relatively high rate. As the temperature of the fluid within the tank 160 gets closer to the desired temperature, the microprocessor 102 controls the fan motor 114 to rotate at a lower rate. When the current temperature of the fluid within the tank 160 is greater than the desired temperature by a second predetermined amount, which is smaller than the first predetermined amount, the microprocessor 102 controls the fan motor 114 to be in an off state.

In one or more embodiments, the memory 108 stores a table or other suitable data structure in which a plurality of values of the difference between the current temperature and the desired temperature of the fluid within the tank 160 is associated with a plurality of corresponding values of the speed of the fan motor 114. Alternatively, the memory 108 may store a formula-driven algorithm that dynamically calculates a desired speed of the fan motor 114 based on a determined difference between the current temperature and the desired temperature of the fluid within the tank 160. It is noted that the speed at which the fan motor 114 rotates, in this embodiment, is proportional to the power level of the control signal supplied thereto. For example, while a signal having a power level corresponding to a maximum power level that can be supplied to the fan motor 114 (e.g., a signal having duty cycle of 100%), the fan motor 114 may rotate at 3000 revolutions per minute. Similarly, while a signal having a power level corresponding to half of the maximum power level (e.g., a signal having duty cycle of 50%) that can be supplied to the fan motor 114, the fan motor 114 may rotate at 1500 revolutions per minute. In one or more embodiments, the memory 108 stores instructions that cause the microprocessor 102 convert a value of the speed of the fan motor 114 obtained from such a table or data structure or algorithm into a corresponding power level value. In one or more embodiments, the memory 108 stores a table or other suitable data structure in which a plurality of values of the difference between the current temperature and the desired temperature of the fluid within the tank 160 is associated with a plurality of power level values for the control signal provided to the fan motor 114. Alternatively, the memory 108 may store an algorithm that dynamically calculates a power level value for driving the fan motor 114 based on a determined difference between the current temperature and the desired temperature of the fluid within the tank 160.

The calibration device 100 also includes a stir motor driver circuit 126 that is electrically coupled to a stir motor 128 and the microprocessor 102. In one or more embodiments, the stir motor driver circuit 126 manages power control and commutation for the stir motor 128. In one or more embodiments, commutation is synchronized with the angular position of the stir motor 128 as it rotates by utilizing feedback to the stir motor driver circuit 126 provided from Hall-effect sensors included in the stir motor 128. In one or more embodiments, the stir motor 128 is a brushless direct current (DC) motor.

The speed of the stir motor 128 is determined by the power supplied to the stir motor 128, which is a function of the current, voltage, and duty cycle of the control signal 132 that is supplied to the stir motor 128. The microprocessor 102 controls the speed at which the stir motor 128 rotates by providing a control signal 130 to the stir motor driver circuit 126, which provides a corresponding control signal 132 to the stir motor 128. In one or more embodiments, the control signals 130 and 132 are pulse width modulated power signals that cause the stir motor 128 to operate at a variety of speeds, depending on a duty cycle of the control signal 130 and a duty cycle of the control signal 132. The duty cycle of each of the control signals 130 and 132 is a ratio of "on" time to a predetermined period of time corresponding to one cycle. In one or more embodiments, the microprocessor 102 generates the control signal 130 in accordance with a program stored by the memory 108. In one or more embodiments, the stir motor driver circuit 126 generates the control signal 132 by amplifying the control signal 130. In one or more embodiments, the control signals 130 and 132 have the same duty cycle. In one or more embodiments, the stir motor 128 provides to the microprocessor 102 a signal 134 indicating the actual speed at which the stir motor 128 is rotating.

Figure 2:
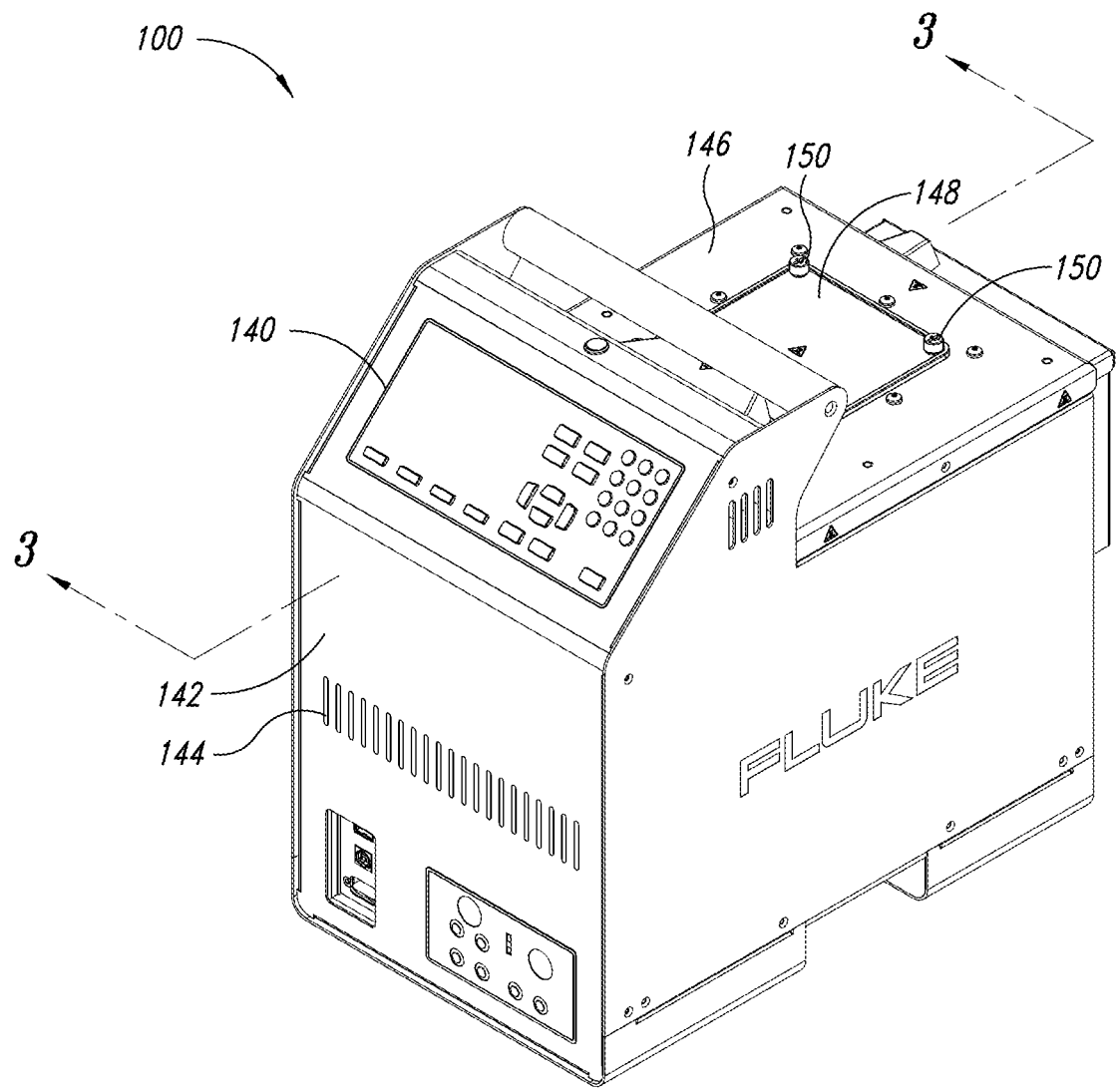
FIG. 2 is an isometric view of a calibration device, according to one or more embodiments of the present disclosure.

FIG. 2 is an isometric view of the calibration device 100, according to one or more embodiments of the present disclosure. The calibration device 100 includes a control panel 140, which includes one or more of the components of the I/O circuitry 110 discussed above. For example, the control panel 140 includes a plurality of buttons that an operator uses to input parameters, which the microprocessor 102 uses to control operation of the calibration device 100.

The calibration device 100 includes a case that has a front panel 142 with a plurality of apertures 144 formed therein. As will be explained below, ambient air enters the calibration device 100 through the apertures 144 formed in the front panel 142 and cools a fluid disposed within the tank 160 that is used during calibration of thermal devices. The tank 160 includes a flange 146 to which a tank cover 148 can be attached using a plurality of bolts 150, for example.

Figure 3:
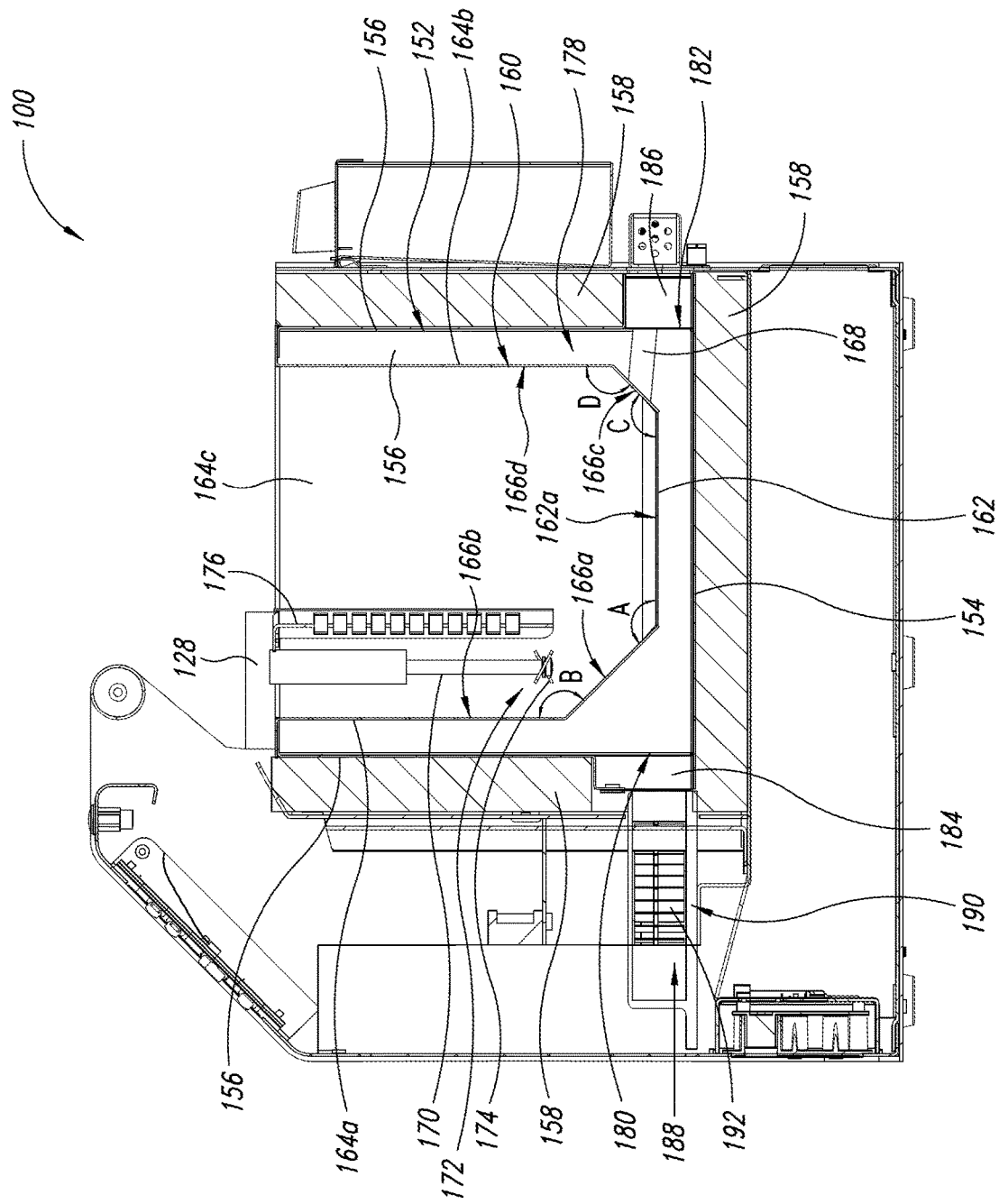
FIG. 3 is a sectional view of a calibration device, according to one or more embodiments of the present disclosure.

FIG. 3 is a sectional view of the calibration device 100 taken along the line 3-3 shown in FIG. 2, according to one or more embodiments of the present disclosure. Components of the calibration device 100 that are not necessary to explain aspects of the calibration device 100 discussed below are not shown in FIG. 3 to simplify the discussion that follows.

A chamber 152 is disposed within the calibration device 100. The chamber 152 includes a bottom wall 154 and a plurality of side walls 156 that extend from the bottom wall 154. An interior surface of the bottom wall 154 and each of the side walls 156 reflect thermal energy (e.g., infrared energy) from the tank 160 that is incident thereon. The tank 160 is disposed within the chamber 152. In one or more embodiments, interior surfaces of the bottom wall 154 and each of the side walls 156 are formed from stainless steel, which reflects a majority of thermal energy that is emitted from the tank 160 back toward the tank 160.

An insulating material 158 is disposed outside of the chamber 152 surrounding an exterior surface of the bottom wall 154 and each of the side walls 156. The insulating material 158 reduces the amount of thermal energy (e.g., heat) that is transferred between the chamber 152 and an ambient environment in which the calibration device 100 is located. In one or more embodiments, the insulating material 158 comprises a ceramic fiber blanket.

The tank 160 includes a bottom wall 162 and four side walls 164a, 164b, 164c, and 164d, which extend from the bottom wall 162. As described in detail below, one or more of the side walls 164a-164d include one or more sloped surfaces that are arranged to efficiently disperse a fluid, which was recently heated by the heater circuit 122 and propelled by the propeller 172, so that the recently heated fluid rapidly mixes in the tank 160 and the fluid is maintained at a constant temperature throughout the tank 160.

In one or more embodiments, a first side wall 164a includes a first surface 166a that extends from a surface 162a of the bottom wall 162, and a second surface 166b that extends from the first surface 166a. A second side wall 164b includes a first surface 166c that extends from the surface 162a of the bottom wall 162, and a second surface 166d that extends from the first surface 166c. The first side wall 164a is opposite the second side wall 164b.

In one or more embodiments, the first surface 166a of the first side wall 164a is longer than the first surface 166c of the second side wall 164b, and the second surface 166d of the second side wall 164b is longer than the second surface 166b of the first side wall 164a. For example, a distance measured along the first surface 166a from the top of the first surface 166a to the bottom of the first surface 166a is greater than a distance measured along the first surface 166c from the top of the first surface 166c to the bottom of the first surface 166c, and a distance measured along the second surface 166d from the top of the second surface 166d to the bottom of the second surface 166d is greater than a distance measured along the second surface 166b from the top of the second surface 166b to the bottom of the second surface 166b.

In one or more embodiments, the first surface 166a of the first side wall 164a and the surface 162a of the bottom wall 162 form an obtuse angle A within the tank 160; the first surface 166a and the second surface 166b of the first side wall 164a form an obtuse angle B within the tank 160; the first surface 166c of the second side wall 164b and the surface 162a of the bottom wall 162 form an obtuse angle C within the tank 160; and the first surface 166c and the second surface 166d of the second side wall 164b form an obtuse angle D within the tank 160. In one or more embodiments, the angle A is 135°, the angle B is 135°, the angle C is 130°, and the angle D is 140°. The angles A, B, C, and D can have other values without departing from the scope of the present disclosure.

While the heater circuit 122 is heating a fluid disposed in the tank 160, some of the fluid that was recently heated by the heater circuit 122 is moved downwardly by the propeller 172 toward the first surface 166a of the first side wall 164a. Some of the recently heated fluid deflects off of the first surface 166a of the first side wall 164a and moves upwardly across the tank 160 away from the first surface 166a of the first side wall 164a. Some of the recently heated fluid travels across a lower portion of the tank 160 and deflects off of the first surface 166c of the second side wall 164b, which causes the fluid to move upwardly across the tank 160 away from the first surface 166c of the second side wall 164b. The arrangement of the first surface 166a of the first side wall 164a and the first surface 166c of the second side wall 164b with respect to each other, and with respect to the surface 162a of the bottom wall 162 and the propeller 172, causes the recently heated fluid to rapidly disperse within the tank 160.

In one or more embodiments, the tank 160 includes rounded features that enable the propeller 172 to efficiently circulate a fluid within the tank 160. Such rounded features prevent the fluid within the tank 160 from being trapped or impeded as the propeller 172 moves the fluid toward the first surface 166a of the first side wall 164a and the first surface 166c of the second side wall 164b, which causes the fluid to move upwardly and disperse throughout the tank 160, as described above. Examples of such rounded features are discussed in greater detail below with reference to FIG. 5.

In one or more embodiments, the bottom wall 162 and side walls 164a-164d are formed from stainless steel. In one or more embodiments, the bottom wall 162 and side walls 164a-164d are integrally formed. In one or more embodiments, the bottom wall 162 and side walls 164a-164d are welded together. In one or more embodiments, a drainage conduit 168 is fluidly coupled to the first surface 166c of the second side wall 164b, which enables a fluid to be drained from the tank 160. In one or more embodiments, each of the surfaces 164a-164d and the surface 162a is flat.

A fluid (e.g., silicone oil) can be placed in the tank 160 via an opening that is accessible while the tank cover 148 is removed. The fluid is then heated to and maintained at a desired temperature. Subsequently, one or more thermal devices are placed in the fluid that is disposed in the tank 160 via the opening, and calibration of the thermal devices is performed. The stir motor 128 is operated to help ensure that the temperature of a fluid disposed in the tank 160 is maintained at a constant temperature that is uniformly distributed throughout the tank 160 while calibration of the thermal devices is performed.

The stir motor 128 is coupled to a fluid propulsion device that causes a fluid within the tank 160 to be circulated. In one or more embodiments, the fluid propulsion device is the propeller 172. A shaft 170 couples the propeller 172 to a rotor (not shown) of the stir motor 128. Accordingly, the propeller 172 rotates while the rotor of the stir motor 128 rotates. The propeller 172 includes a plurality of blades 174 that are angled to move the fluid toward the first surface 166a of the first side wall 164a while the propeller 172 rotates in a predetermined direction (e.g., clockwise). A guard 176 having a plurality of apertures formed therein is disposed within the tank 160 adjacent to the propeller 172. The guard 176 prevents a thermal device from coming into contact with the propeller 172 while the device is being calibrated within the tank 160.

In one or more embodiments, the fluid propulsion device is an impeller that is disposed within a pump. The impeller is coupled to the stir motor 128. Rotation of the stir motor 128 causes the impeller to rotate thereby creating a pressure differential within the pump, which causes a fluid within the tank 160 to be drawn into an inlet of the pump and then forced out of an outlet of the pump. The pump is arranged so that fluid exiting the outlet is heated by the heater circuit 122. Additionally, fluid exiting the outlet of the pump is directed toward the first surface 166a of the first side wall 164a, in a manner that is similar to embodiments in which the propeller 172 directs the fluid toward the first surface 166a of the first side wall 164a.

In one or more embodiments, the fluid propulsion device is a piston, plunger, or diaphragm that is disposed within a pump. The piston, plunger, or diaphragm is coupled to the stir motor 128. Rotation of the stir motor 128 causes the piston, plunger, or diaphragm to reciprocate (e.g., move in a first direction and then in a second direction, wherein the first direction is opposite the second direction) within a chamber thereby creating a pressure differential within the pump, which causes a fluid within the tank 160 to be drawn into an inlet of the pump and then forced out of an outlet of the pump. The pump is arranged so that fluid exiting the outlet is heated by the heater circuit 122. Additionally, fluid exiting the outlet of the pump is directed toward the first surface 166a of the first side wall 164a, in a manner that is similar to embodiments in which the propeller 172 directs the fluid toward the first surface 166a of the first side wall 164a.

It may be desirable to lower the temperature of the fluid disposed in the tank 160 before, during, and after calibration testing. For example, while the stir motor 128 is operated, friction between the propeller 172 and the fluid may cause the temperature of the fluid within to rise above a desired temperature at which a thermal device is to be calibrated. The calibration device 100 is arranged so that the fluid within the tank 160 can be cooled quickly, if necessary, and maintained at a constant temperature.

More particularly, the tank 160 is spaced apart from the chamber 152. A conduit 178 is formed between the tank 160 and the chamber 152. The conduit 178 extends between the bottom wall 154 of the chamber 152 and the bottom wall 162 of the tank 160, and between the side walls 156 of the chamber 152 and respective side walls 164a-164c of the tank 160. The conduit 178 includes an inlet 180 and an outlet 182, which are disposed in a lower portion of the chamber 152 to help prevent natural convection of air within the conduit 178. A valve 184 is disposed adjacent to the inlet 180. In one or more embodiments, a valve 186 is disposed adjacent to the outlet 182. In one or more embodiments, the valve 184 and the valve 186 are check valves that enable air to pass therethrough in only one direction. More particularly, the valve 184 enables air to pass only into the inlet 180 of the conduit 178, and the valve 186 enables air to pass only out of the outlet 182 of the conduit 178. Some embodiments may have only one valve, e.g., the valve 184 disposed adjacent to the inlet 180. In one or more embodiments, the conduit 178 exposes the entire external surface of the tank 160 to air that flows through the conduit 178.

A fan 188 is disposed within the calibration device 100 adjacent to the chamber 152. The fan 188 includes the fan motor 114 and a propeller 190 having a plurality of blades 192. A rotor (not shown) of the fan motor 114 is coupled to the propeller 190. Accordingly, the propeller 190 rotates while the fan motor 114 rotates. The blades 192 are angled such that, while the propeller 190 rotates in a predetermined direction (e.g., clockwise), the propeller 190 draws ambient air through apertures 144 formed in the front panel 142 and directs the ambient air through the valve 184 into the inlet 180 of the conduit 178. The fan 188 provides a relatively high-pressure air flow into the conduit 178. In one or more embodiments, the ambient air travels through the conduit 178 around the tank 160, exits through the outlet 182, passes through the valve 186, and continues out of the calibration device 100 through apertures formed in a back panel of the case of the calibration device 100.

As the ambient air passes over the bottom wall 162 and the side walls 164a-164d of the tank 160, the ambient air is heated by the high temperature fluid in the tank 160. Subsequently, the propeller 190 forces the heated air out of the calibration device 100. Accordingly, while the fan motor 114 rotates, a fluid disposed in the tank 160 is cooled by the flow of ambient air passing over the bottom wall 162 and the side walls 164a-164d of the tank 160.

Figure 4:
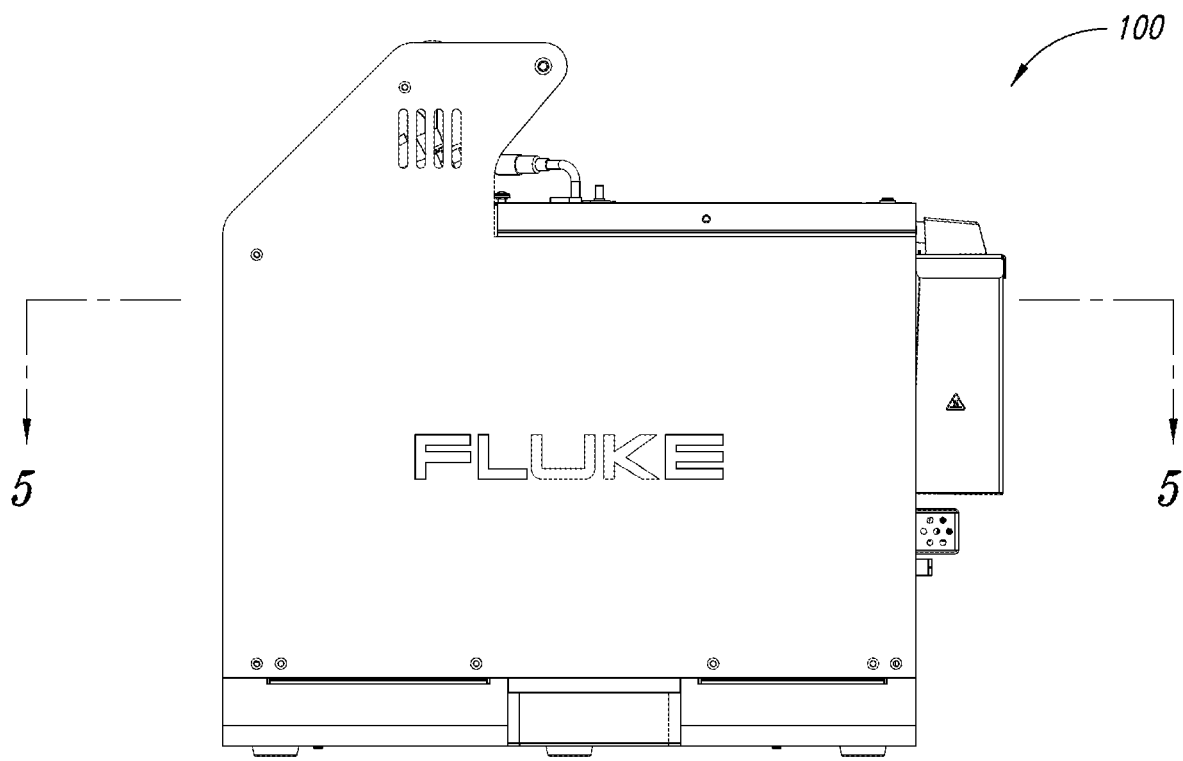
FIG. 4 is a side view of a calibration device, according to one or more embodiments of the present disclosure.
Figure 5:
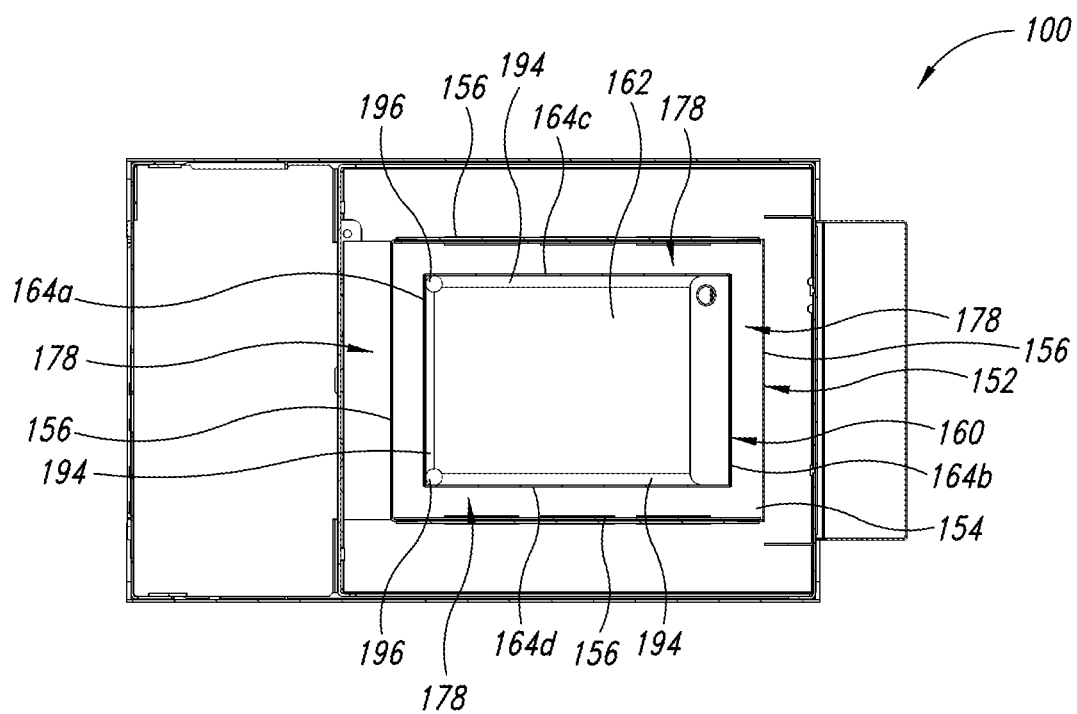
FIG. 5 is a sectional view of a calibration device, according to one or more embodiments of the present disclosure.

FIG. 4 is a side plan view of the calibration device 100, according to one or more embodiments of the present disclosure. FIG. 5 is a sectional view of the calibration device 100 taken along the line 5-5 in FIG. 4, according to one or more embodiments of the present disclosure. Components of the calibration device 100 that are not necessary to explain aspects of the calibration device 100 discussed below are not shown in FIG. 5 to simplify the discussion that follows.

As shown in FIG. 5, the conduit 178 extends around the side walls 164a-164d of the tank 160, between the side walls 164a-164d of the tank 160 and the side walls 156 of the chamber 152. Accordingly, air flowing in the conduit 178 contacts a large surface area on the exterior surface of the tank 160, which enables the air to rapidly remove heat from the fluid within the tank 160.

In one or more embodiments, the tank 160 includes four rounded surfaces 194, three of which are shown in FIG. 5. More particularly, the bottom wall 162 has a rectangular shape. Each rounded surface 194 is formed between one of the four sides of the bottom wall 162 and the bottom of one of the side walls 164a-164d. In one or more embodiments, each rounded surface 194 has the shape of an elliptical or circular arc with a radius of 5 millimeters. In one or more embodiments, each rounded surface 194 has the shape of an elliptical or circular arc with a radius of 10 millimeters. Each rounded surface 194 can have a radius of a different length or of a different round shape without departing from the scope of the present disclosure. The rounded surfaces 194 prevent the fluid in the tank 160 from becoming trapped in the lower portions of the tank 160 where the side walls 164a-164d meet the bottom wall 162, as the fluid is being circulated by the propeller 172.

In one or more embodiments, the tank 160 includes four rounded corners 196, two of which are shown in FIG. 5. Each rounded corner 196 is formed at one of the four lower corners of the tank 160 where the bottom wall 162 and two adjacent side walls 164a-164d meet. In one or more embodiments, each rounded corner 196 has the shape of a portion of an ellipsoid or spherical surface with a radius of 5 millimeters. In one or more embodiments, each rounded corner 196 has the shape of a portion of an ellipsoid or spherical surface with a radius of 10 millimeters. Each rounded corner 196 can have a radius of a different length or of a different round shape without departing from the scope of the present disclosure. The rounded corners 196 prevent the fluid in the tank 160 from becoming trapped in the lower corners of the tank 160, where pairs of adjacent side walls 164a-164d meet the bottom wall 162, as the fluid is being circulated by the propeller 172. The rounded surfaces 194 and the rounded corners 196 enable the fluid to circulate within the tank 160 more efficiently than in conventional tanks that do not include such rounded features.

Figure 6:
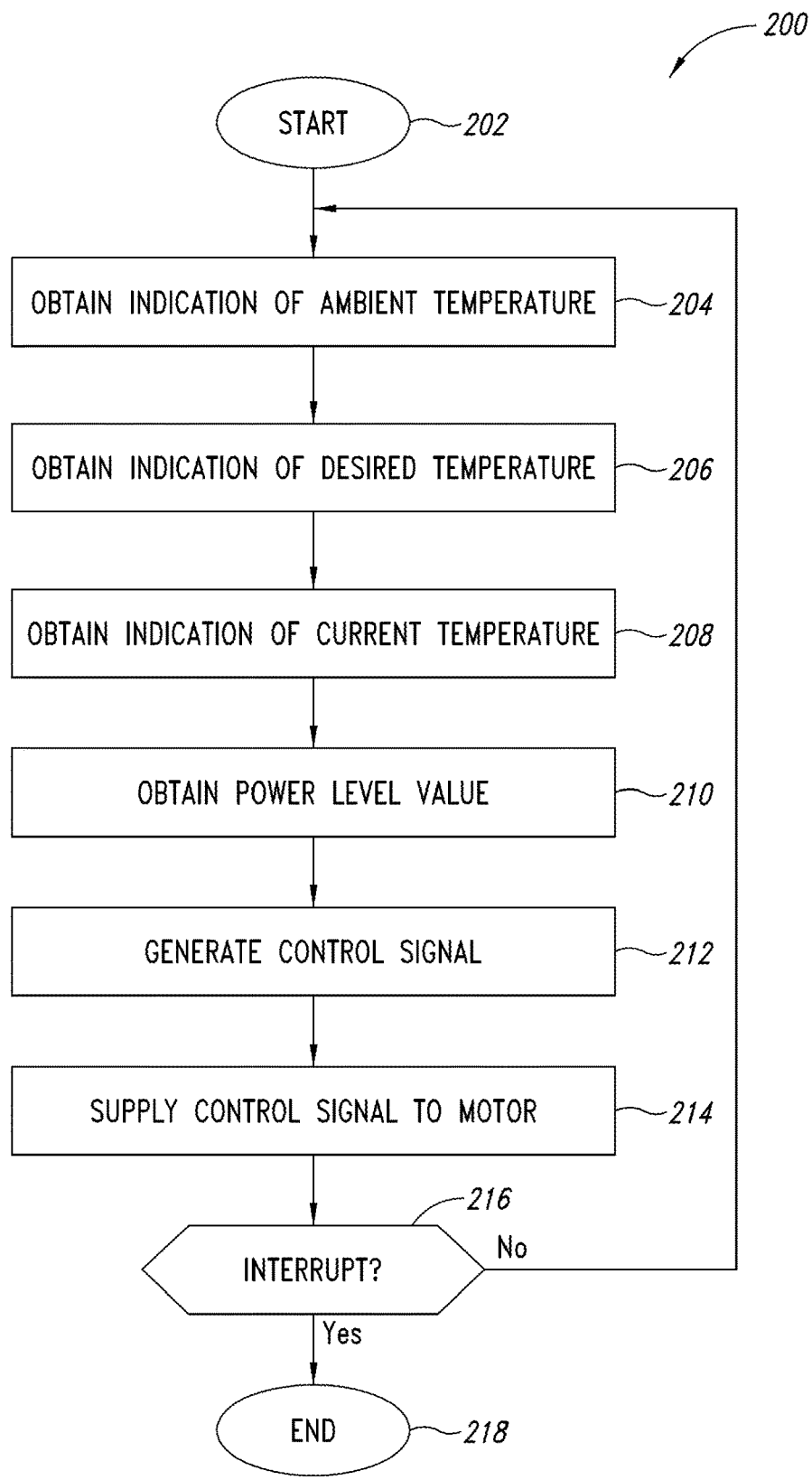
FIG. 6 is a flowchart of a method, according to one or more embodiments of the present disclosure.

FIG. 6 is a flowchart of a method 200 of operating the calibration device 100, according to one or more embodiments of the present disclosure. The method begins at 202, for example, when an operator places the calibration device 100 in a mode for configuring parameters for performing calibration testing. The method 200 then proceeds to 204.

At 204, an indication of an ambient temperature is obtained. The ambient temperature is a temperature in the environment in which the calibration device 100 is located. In one or more embodiments, the microprocessor 102 receives the indication of the ambient temperature in response to an operator actuating one or more buttons of a keypad of the control panel 140 to enter the ambient temperature, or in response to the operator selecting the ambient temperature within a list of predetermined temperatures included in a menu. In one or more embodiments, the microprocessor 102 receives the indication of the ambient temperature from one of the temperature sensors 124. The method 200 then proceeds to 206.

At 206, an indication of a desired temperature is obtained. The desired temperature is a temperature at which a fluid in the tank 160 is to be heated and maintained. For example, the microprocessor 102 receives the indication of the desired temperature in response to an operator actuating one or more buttons of a keypad of the control panel 140 to enter the desired temperature, or in response to the operator selecting the desired temperature within a list of predetermined temperatures included in a menu. The method 200 then proceeds to 208.

At 208, an indication of a current temperature is obtained. The current temperature is a current temperature of the fluid in the tank 160. For example, the microprocessor 102 receives the indication of the current temperature from one or more of the temperature sensors 124. The method 200 then proceeds to 210.

At 210, a power level value is obtained. The power level value is a parameter associated with the control signal 118 that is provided to the fan motor 114, for example, a current value, a voltage value, or a duty cycle value associated with the control signal 118. In one or more embodiments, the microprocessor 102 executes instructions stored in the memory 108 to obtain the power level value based on the indications of the desired temperature and the current temperature obtained at 206 and 208, respectively. For example, the memory 108 stores a table or other suitable data structure that associates a plurality of values of differences between the current temperature and the desired temperature of the fluid in the tank 160 with a plurality of corresponding power level values. The microprocessor 102 calculates the difference between the current temperature and the desired temperature of the fluid in the tank 160 based on the indications obtained at 206 and 208, respectively. The microprocessor 102 then obtains a power level value that is associated with a value of the difference between the current temperature and the desired temperature of the fluid in the tank 160 that most closely matches the calculated difference between the current temperature and the desired temperature of the fluid in the tank 160.

In one or more embodiments, the microprocessor 102 takes the ambient temperature of the environment in which the calibration device 100 is located into consideration when obtaining the power level value at 210. For example, the memory 108 stores a plurality of tables or other suitable data structures that associate a plurality of values of differences between the current temperature and the desired temperature of the fluid in the tank 160 with a plurality of corresponding power level values, wherein each table is associated with a different value of a difference between the temperature of the fluid in the tank 160 and the ambient temperature. In one or more embodiments, the values included in such tables are obtained through experimentation in view of the following equation.

$$Q = K \times A \times \Delta T \qquad \text{(Equation 1)}$$

In equation 1, the parameter Q is the cooling energy required to establish a desired temperature balance and thermal response using the calibration device 100. The parameter K is the thermal conductivity to the ambient environment in which the calibration device 100 is located relative to heat loss or cooling. The parameter $\Delta T$ is the temperature difference between the fluid in the tank 160 and the ambient environment. The parameter A is the area of heat exchange. The calibration device 100 is constructed such that K is $\Delta T$ variable so that there is sufficient isolation to the ambient environment for good control and for safety while providing a higher degree of heat loss when needed.

In one or more embodiments, the microprocessor 102 executes instructions stored in the memory 108 to obtain the power level value based on the indications of the ambient temperature, the desired temperature, and the current temperature obtained at 204, 206, and 208, respectively. More specifically, the microprocessor 102 calculates the difference between the current temperature of the fluid in the tank 160 and the ambient temperature based on the indications of the ambient temperature and the current temperature obtained at 204 and 206, respectively. The microprocessor 102 also calculates the difference between the current temperature of the fluid in the tank 160 and the desired temperature of the fluid in the tank 160 based on the indications obtained at 206 and 208, respectively. In addition, the microprocessor 102 selects a table or data structure that is associated with a value of the difference between the current temperature of the fluid in the tank 160 and the ambient temperature that most closely matches the calculated difference between the current temperature of the fluid in the tank 160 and the ambient temperature. The microprocessor 102 then obtains, from the selected table or data structure, a power level value that is associated with a value of the difference between the current temperature and the desired temperature of the fluid in the tank 160 that most closely matches the calculated difference between the current temperature and the desired temperature of the fluid in the tank 160.

In one or more embodiments, the power level values included in the above-described tables or data structures are duty cycle values of the control signal 118 that is supplied to the fan motor 114. In one or more embodiments, the maximum duty cycle value included in such a table or data structure is less than 100%, for example, 75%. When the control signal 118 that is supplied to the fan motor 114 has a duty cycle that is higher than the maximum duty cycle value, portions of fluid near walls of the tank 160 may become cooled too quickly. As a result, the propeller 172 may not be able to stir the fluid in the tank 160 fast enough to ensure that the fluid has a uniform temperature throughout the volume of fluid, which is undesirable while calibration of thermal devices is being performed.

In one or more embodiments, the memory 108 stores tables or other suitable data structures that are similar those described above except that, instead of storing power level values, the tables or data structures store values of speeds of the fan motor 114. In one or more embodiments, after a speed of the fan motor 114 is obtained from one of those tables or data structures, the microprocessor 102 uses a predefined formula or table to convert the obtained speed into a power level value that causes the fan motor 114 to rotate at the obtained speed.

After the power level value is obtained at 210, the method 200 proceeds to 212. At 212, a control signal is generated. For example, the microprocessor 102 generates a control signal 116 having a duty cycle corresponding to the power level value obtained at 210, and supplies the control signal 116 to the fan motor driver circuit 112. The fan motor driver circuit 112 generates a corresponding control signal 118 based on the control signal 116, for example, by amplifying the control signal 116. The method 200 then proceeds to 214.

At 214, the control signal is supplied to a motor. For example, the fan motor driver circuit 112 supplies the control signal 118 to the fan motor 114. The method 200 then proceeds to 216.

At 216, a determination is made regarding whether an interrupt has been generated. For example, the microprocessor 102 checks the value of a predetermined variable or a voltage level of a predetermined terminal and determines whether the value of the variable or the voltage level of the terminal has a predetermined value. The interrupt may be generated when an operator manipulates one or more buttons on the control panel 140 to initiate a procedure for shutting down the calibration device 100, for example. If a determination is made at 216 that an interrupt has not been generated, the method 200 returns to 204, and the acts 204-216 are repeated. If a determination is made at 216 that an interrupt has been generated, the method 200 proceeds to 218, where the method 200 ends.

The calibration device 100 performing the method 200 provides an improvement over conventional calibration baths. For example, in one experiment, a fluid was heated to 250° C. using a conventional calibration bath and also using a calibration device according to the present disclosure, and the amount of time required to cool the fluid to 35° C. was measured for each. The conventional calibration bath took over 9 hours to cool the fluid to 35° C.; however, the calibration device according to the present disclosure took only 45 minutes. Thus, the calibration device 100 according to the present disclosure can improve calibration time efficiency by reducing the amount of time an operator must wait before being able to safely move the calibration device 100 after calibration of thermal devices has been performed, for example.

In addition, the calibration device 100 performing the method 200 can extend the useful life of fluids used in the calibration device 100 because the fluids do not remain heated above their oxidation temperatures for long periods of time after calibration of thermal devices has been performed using those fluids. Because fluids used in the calibration device 100 can be expensive, extending the useful life of such fluids can result in significant cost savings over time. In addition, the calibration device 100 performing the method 200 can operate at just 5° C. above ambient, for example, which cannot be accomplished with conventional calibration baths.

Figure 7:
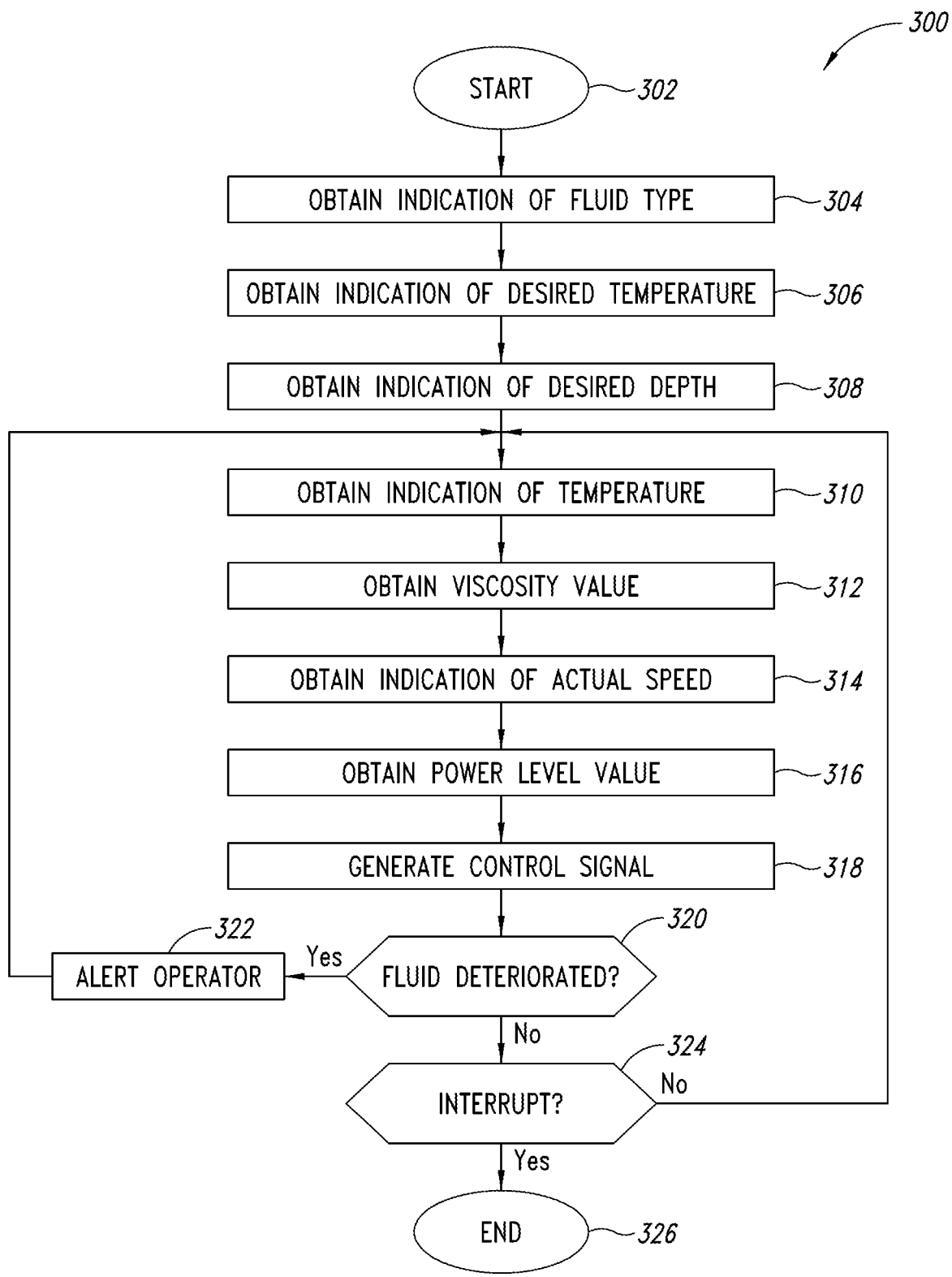
FIG. 7 is a flowchart of a method, according to one or more embodiments of the present disclosure.

FIG. 7 is a flowchart of a method 300 of operating the calibration device 100, according to one or more embodiments of the present disclosure. The calibration device 100 performs the method 300 to control a power level of the control signal 132 provided to the stir motor 128, which controls a speed at which the stir motor 128 rotates. If the stir motor 128 rotates too slowly, a fluid in the tank 160 is poorly stirred and develops temperature disparities throughout the tank 160, which is undesirable while thermal devices are being calibrated in the fluid. If the stir motor 128 rotates too fast, surface turbulence and splashing can cause heating and cooling disturbances that result in temperature fluctuations throughout the fluid in the tank 160, which is undesirable while thermal devices are being calibrated in the fluid. In accordance with the method 300, the speed at which the stir motor 128 rotates is controlled to minimize or eliminate temperature disparities and fluctuations throughout the fluid in the tank 160.

The method 300 begins at 302, for example, when an operator places the calibration device 100 in a mode for configuring parameters for performing calibration testing. The method 300 then proceeds to 304. At 304, an indication of a fluid type is obtained. The fluid type is the type of fluid that is disposed within the tank 160. In one or more embodiments, the microprocessor 102 receives the indication of the fluid type in response to an operator actuating one or more buttons of a keypad of the control panel 140 to enter the fluid type, or in response to the operator selecting the fluid type within a list of predetermined fluid types included in a menu. The method 300 then proceeds to 306.

At 306, an indication of a desired temperature is obtained. The desired temperature is a temperature at which a fluid in the tank 160 is to be heated and maintained. In one or more embodiments, the microprocessor 102 receives the indication of the desired temperature in response to an operator actuating one or more buttons of a keypad of the control panel 140 to enter the desired temperature, or in response to the operator selecting the desired temperature within a list of predetermined temperatures included in a menu. The method 300 then proceeds to 308.

At 308, an indication of a desired depth is obtained. The desired depth is the depth of the fluid in the tank 160 that is desired while the stir motor 128 is operated. In one or more embodiments, the microprocessor 102 receives the indication of the desired depth in response to an operator actuating one or more buttons of a keypad of the control panel 140 to enter the desired depth, or in response to the operator selecting the desired depth within a list of predetermined depths included in a menu. The method 300 then proceeds to 310. In one or more embodiments, an indication of a desired depth is not obtained at 308. In other words, obtaining an indication of a desired depth at 308 is optional.

At 310, an indication of a temperature is obtained. The temperature is the current temperature of the fluid in the tank 160. In one or more embodiments, the microprocessor 102 receives the indication of the temperature of the fluid from one or more of the temperature sensors 124. The method 300 then proceeds to 312.

At 312, a viscosity value is obtained. The viscosity value is the expected viscosity of the fluid in the tank 160 at the current temperature of the fluid. In one or more embodiments, the microprocessor 102 executes instructions stored in the memory 108 to obtain the viscosity value based on the indication of the fluid type obtained at 304 and the indication of the temperature of the fluid in the tank 160 obtained at 310.

Figure 8:
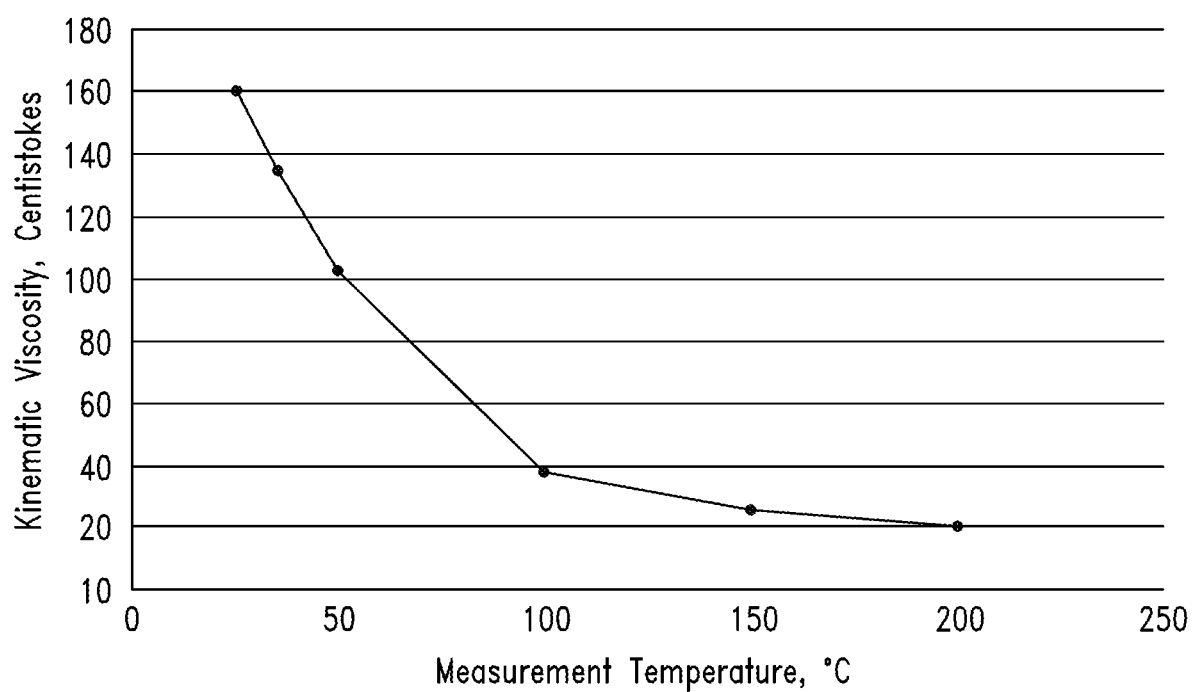
FIG. 8 is a graph showing the viscosity of a fluid over a range of temperatures, according to one or more embodiments.

The viscosity of a particular type of fluid varies as a function of temperature. FIG. 8 is a graph showing the viscosity of an exemplary type of fluid over a range of temperatures, according to one or more embodiments. As shown in FIG. 8, the viscosity of the fluid decreases with increasing temperature. If the fluid were to be stirred at a constant rate as the fluid is heated, as is done in conventional calibration baths, splashing may result at higher temperatures at which the viscosity of the fluid is relatively low. Similarly, if the viscosity of a different type of fluid increases with increasing temperature, stirring the fluid at a constant rate could result in splashing at lower temperatures at which the viscosity of the fluid is relatively low. Accordingly, it may be desirable to adjust the speed of the stir motor 128 as the temperature of a fluid changes.

In one or more embodiments, the memory 108 stores a plurality of tables or other suitable data structures that associate a plurality of viscosity values with a plurality of corresponding temperature values, wherein each table or data structure is associated with a different fluid type value. For example, the memory 108 stores a plurality of tables or other suitable data structures including information similar to the information included in FIG. 8. The memory 108 stores instructions that cause the microprocessor 102 to select one of the tables or data structures that is associated with a fluid type value corresponding to the type of fluid in the tank 160, based on the indication of fluid type obtained at 304. The microprocessor 102 then obtains from the selected table or data structure a viscosity value that is associated with a temperature value that most closely matches the current temperature of the fluid, based on the indication of the temperature of the fluid obtained at 310.

Alternatively, the memory 108 stores one or more algorithms that correlate fluid type values with respective formulas that can be utilized to dynamically calculate a viscosity value based on a current temperature of the fluid identified by a particular fluid type value. The memory 108 stores instructions that cause the microprocessor 102 to select one of the algorithms that is associated with a fluid type value corresponding to the type of fluid in the tank 160, based on the indication of fluid type obtained at 304. The microprocessor 102 then obtains from the selected algorithm a viscosity value that is calculated using a temperature value derived from the current temperature of the fluid, based on the indication of the temperature of the fluid obtained at 310.

At 314, an indication of an actual speed is obtained. The actual speed is the speed at which the stir motor 128 is currently rotating. The actual speed of the stir motor 128 may be indicated by the signal 134 provided by the stir motor 128. In one or more embodiments, the signal 134 is a tachometer signal indicating a number of revolutions per minute at which the stir motor 128 is currently rotating. In one or more embodiments, the stir motor 128 is a brushless DC motor containing Hall-effect sensors that generate electrical pulses in the signal 134 as the stir motor 128 rotates, wherein the frequency of the pulses indicates the rotational speed of the stir motor 128.

At 316, a power level value is obtained. The power level value is associated with the control signal 132 that is provided to the stir motor 128. In one or more embodiments, the power level value correlates with the duty cycle of the control signal 132 that is provided to the stir motor 128. In one or more embodiments, the power level value correlates with a voltage (e.g., peak voltage) of the control signal 132 that is provided to the stir motor 128. In one or more embodiments, the power level value correlates with a current (e.g., peak current) of the control signal 132 that is provided to the stir motor 128.

The speed at which the stir motor 128 rotates is a function of the amount of power supplied to the stir motor 128. In one or more embodiments, the target speed of the stir motor 128 is a predetermined speed (e.g., 2,000 revolutions per minute), and the memory 108 stores information specifying the predetermined speed. The memory 108 also stores instructions that cause the microprocessor 102 to obtain the power level value at 316 based on the indication of the actual speed obtained at 314. If the actual speed of the stir motor 128 is greater than the target speed of the motor 128, the microprocessor 102 obtains a power level value that causes the speed of the stir motor 128 to decrease. If the actual speed of the stir motor 128 is less than the target speed of the motor 128, the microprocessor 102 obtains a power level value that causes the speed of the stir motor 128 to increase. If the actual speed of the stir motor 128 is equal to the target speed of the stir motor 128, the microprocessor 102 obtains a power level value that causes the speed of the stir motor 128 to remain the same. In one or more embodiments, the memory 108 stores one or more formulas that the microprocessor 102 uses to obtain a power level value based on a difference between the target speed and the actual speed of the stir motor 128. For example, the memory 108 stores instructions that cause the microprocessor 102 to perform a proportional-integral-derivative algorithm to obtain the power level value at 316 based on the difference between the target speed and the actual speed of the stir motor 128.

The target speed at which the stir motor 128 rotates may be optimized for different viscosities of the fluid being stirred by the stir motor 128. Accordingly, the amount of power supplied to the stir motor 128 may be optimized for different viscosities. In one or more embodiments, the microprocessor 102 dynamically changes the target speed at which the stir motor 128 rotates as the fluid in the tank 160 is heated and the viscosity thereof changes.

Figure 9:
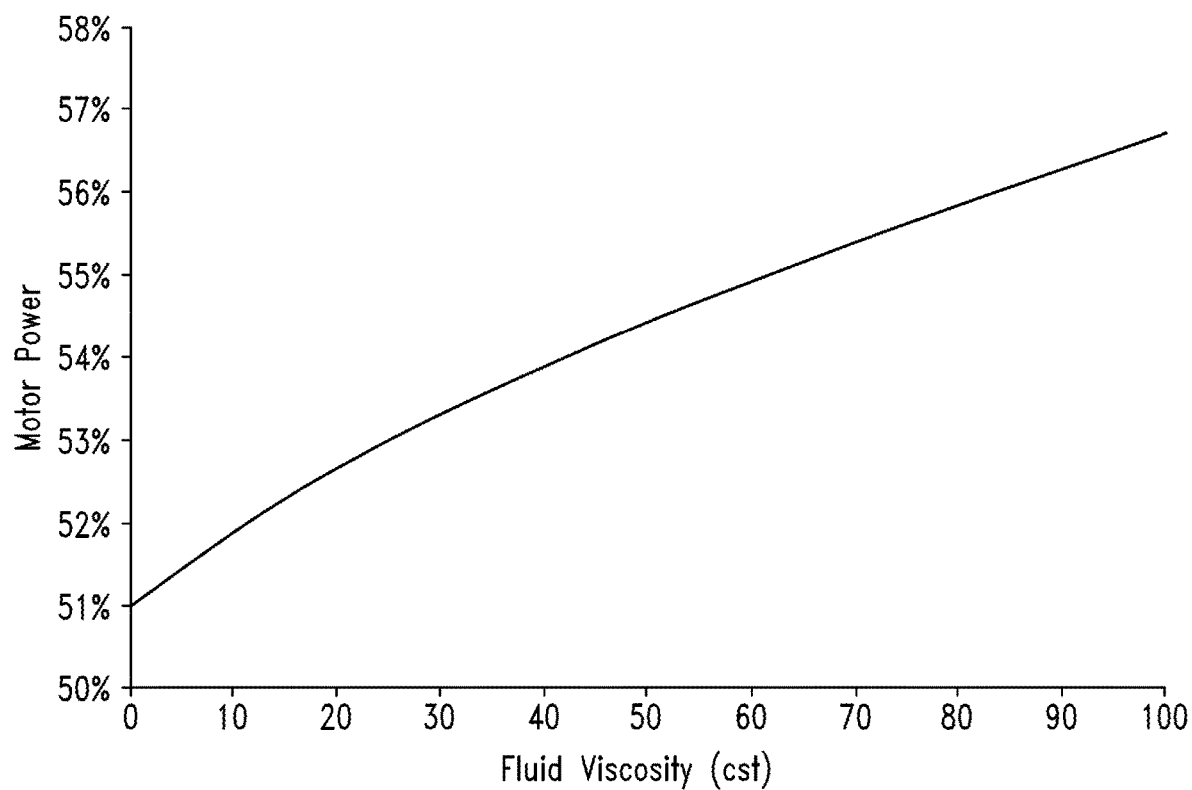
FIG. 9 is a graph showing motor power values of a control signal provided to a stir motor over a range of viscosity values, according to one or more embodiments.

FIG. 9 is a graph showing motor power values of the control signal 132 provided to the stir motor 128 over a range of viscosity values, according to one or more embodiments. The motor power values are duty cycle values of the control signal 132 provided to the stir motor 128. In one or more embodiments, the memory 108 stores a table or other suitable data structure that associates a plurality of power level values with a plurality of corresponding viscosity values. For example, the memory 108 stores a table or other suitable data structure including the information shown in FIG. 9. Alternatively, one or more formulas are stored in the memory 108 and used to dynamically calculate power level values based on determined viscosity values. The memory 108 also stores instructions that cause the microprocessor 102 to obtain the power level value at 316, based on the viscosity value obtained at 312. More particularly, in one or more embodiments, the microprocessor 102 obtains from the above-described table or data structure a power level value that is associated with a viscosity value that most closely matches the viscosity value obtained at 312.

In one or more embodiments, the speed at which the stir motor 128 rotates is optimized for different viscosities and for different desired depths of a fluid in the tank 160. For example, the memory 108 stores a plurality of tables or other suitable data structures that associates a plurality of power level values with a plurality of corresponding viscosity values, wherein each of the tables or data structures is associated with a different depth value. Alternatively, one or more formulas are stored in the memory 108 and used to dynamically calculate power level values based on determined viscosity values and desired depth value. The memory 108 also stores instructions that cause the microprocessor 102 to obtain the power level value at 316, based on the indication of the desired depth obtained at 308 and the viscosity value obtained at 312. More particularly, in one or more embodiments, the microprocessor 102 selects one of the tables or data structures that is associated with a depth value that most closely matches the desired depth of the fluid in the tank 160 based on the indication of the desired depth obtained at 308. The microprocessor 102 then obtains from the selected table or data structure a power level value that is associated with a viscosity value that most closely matches the viscosity value obtained at 312. If the method 300 includes obtaining an indication of the desired depth of fluid at 308, in one or more embodiments the calibration device 100 includes a cylindrical tube disposed around the shaft 170 and the propeller 172, and the memory 108 stores instructions that cause the microprocessor 102 to generate the control signal 132 such that it causes the stir motor 128 to reverse a rotational direction so that the propeller 160 moves a fluid in the tank 160 upwardly to cause the fluid to have a desired depth.

After the power level value is obtained at 316, the method 300 proceeds to 318. At 318, a control signal is generated. In one or more embodiments, the memory 108 stores instructions that cause the microprocessor 102 to generate the control signal 130 with a duty cycle that correlates with the power level value obtained at 316, and supply the control signal 130 to the stir motor driver circuit 126. The stir motor driver circuit 126 generates a corresponding control signal 132 based on the control signal 130, for example, by amplifying the control signal 130. The stir motor driver circuit 126 supplies the control signal 132 to the stir motor 128. The method 300 then proceeds to 320.

At 320, a determination is made regarding whether the fluid in the tank 160 is deteriorated. As described below, the microprocessor 102 obtains at least one threshold viscosity value, obtains a value of the actual viscosity of the fluid in the tank 160, compares the threshold viscosity value and the actual viscosity value of the fluid in the tank 160, and a determines whether the fluid in the tank 160 is deteriorated based on a result of comparing the threshold viscosity value and the actual value of the viscosity of the fluid in the tank 160. Stated more generally, the microprocessor 102 obtains at least one first viscosity value, obtains a second viscosity value, compares the at least one first viscosity value and the second viscosity value, and a determines whether the fluid in the tank 160 is deteriorated is made based on a result of comparing the at least one first viscosity value and the second viscosity value.

In one or more embodiments, the memory 108 stores a viscosity threshold value corresponding to a maximum viscosity of a fluid, wherein the viscosity threshold value is independent of a fluid type of the fluid in the tank. The memory 108 also stores instructions that cause the microprocessor 102 to determine that the fluid is deteriorated if the fluid's actual viscosity is greater than the maximum viscosity threshold value.

In one or more embodiments, the memory 108 stores a plurality of viscosity threshold values in association with a plurality of corresponding fluid types, wherein each viscosity threshold value is a maximum viscosity associated with one of the fluid types. The memory 108 also stores instructions that cause the microprocessor 102 to determine that a fluid of a particular fluid type is deteriorated if the fluid's actual viscosity is greater than the maximum viscosity threshold value associated with that fluid type.

In one or more embodiments, the memory 108 stores a plurality of pairs of viscosity threshold values in association with a plurality of fluid types, wherein each pair of viscosity threshold values includes an upper range value and a lower range value that define a range of viscosities. The memory 108 also stores instructions that cause the microprocessor 102 to determine that a fluid of a particular fluid type is deteriorated if the fluid's actual viscosity is not within the range of viscosities defined by the pair of viscosity threshold values associated with that fluid type.

Figure 10:
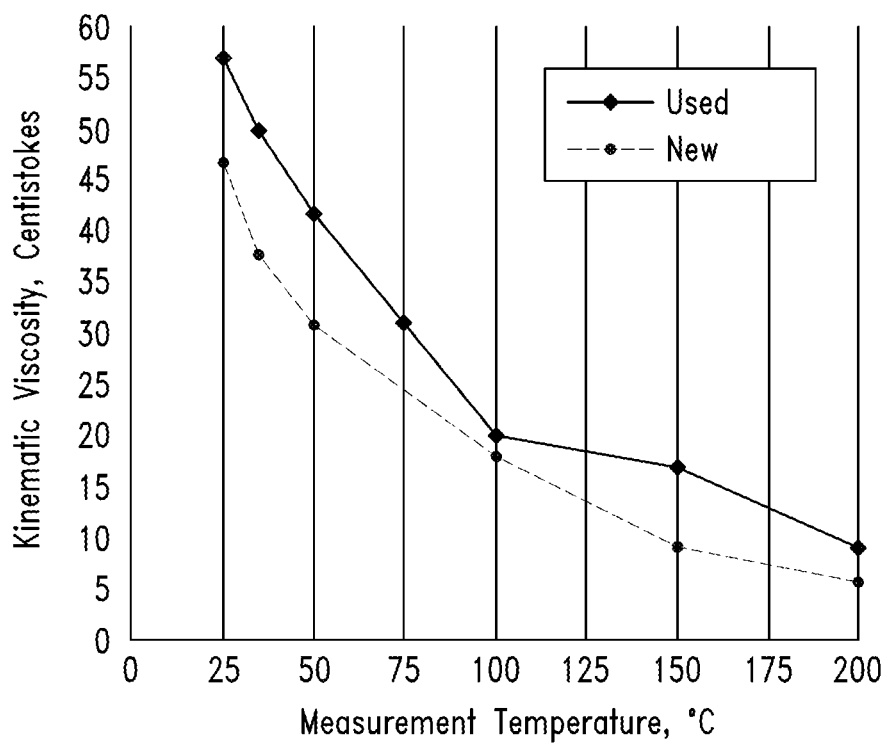
FIG. 10 is a graph showing viscosities of an exemplary type of fluid, when new and when used, over a range of temperatures, according to one or more embodiments.

FIG. 10 is a graph showing viscosities of an exemplary type of fluid, when the fluid is new and when the fluid is used, over a range of temperatures, according to one or more embodiments. As shown in FIG. 10, the viscosity of the fluid at a given temperature increases with use. In one or more embodiments, the data set labeled "New" represents a lower range value of a range of viscosity values and the data set labeled "Used" represents an upper range value of the range of viscosity values. If the viscosity of the fluid at a given temperature is greater than or equal to the lower range value at that temperature and is less than or equal to the upper range value at that temperature, the fluid is not considered to be deteriorated. If not, the fluid is considered to be deteriorated. When this type of fluid is deteriorated, the fluid has a higher viscosity than when the fluid is new, for a given temperature. Accordingly, when the fluid is deteriorated, the fluid applies greater torque to the propeller 172 compared to when the fluid is new, which lowers the speed of the stir motor 128 compared to when the fluid is new, for a given temperature and a given power level of the control signal 132 that is supplied to the stir motor 128.

In one or more embodiments, the memory 108 stores a plurality of tables or other suitable data structures that associates a plurality of ranges of viscosity values with a plurality of corresponding temperature values, wherein each table or data structure is associated with a different fluid type value. Alternatively, one or more formulas are stored in the memory 108 and used to associate viscosity values with corresponding temperature values for different fluid types.

The memory 108 also stores instructions that cause the microprocessor 102 to determine whether the fluid in the tank 160 is deteriorated based on the indication of the fluid type obtained at 304, the indication of the temperature of the fluid obtained at 310, the power level value obtained at 316, and the indication of the actual speed obtained at 314. In one or more embodiments, the microprocessor 102 selects one of the tables or data structures that is associated with the type of fluid in the tank 160, based on the indication of the fluid type obtained at 304. The microprocessor 102 obtains from the selected table or data structure at least one first viscosity value, for example, a lower range value and an upper range value that are associated with a temperature value that most closely matches the temperature of the fluid in the tank 160, based on the indication of the temperature of the fluid obtained at 310. The microprocessor 102 also obtains a second viscosity value, for example, the actual viscosity of the fluid in the tank 160 based on the power level value obtained at 316.

In one or more embodiments, the memory 108 stores instructions that, when executed, cause the microprocessor 102 to obtain the second viscosity value (e.g., actual viscosity value) using a torque balance equation. The stir motor 128 applies a first torque in a first direction to the shaft 170, which causes the shaft 170 to rotate in the first direction. As the shaft 170 rotates in a fluid, the fluid exerts a force on the blades 174 of the propeller 172, thereby causing a second torque on the shaft 170 in a second direction, wherein the second direction is opposite the first direction. As the viscosity of the fluid changes with use, the force applied by the fluid changes and thus, the second torque on the shaft 170 changes. For example, if the viscosity of the fluid increases over time from being used, the force applied by the fluid increases over time as the fluid is used, which increases the second torque on the shaft 170. Accordingly, the microprocessor 102 must cause the first torque applied by the stir motor 128 on the shaft 170 to increase in order to keep the stir motor 128 rotating at a constant speed. The microprocessor 102 obtains a torque value based on a change in a power level value (e.g., current) associated with the control signal 132 that is supplied to the stir motor 128 by the stir motor driver circuit 126. The microprocessor 102 uses the torque value to obtain the second viscosity value, as described below.

In one or more embodiments, the memory 108 stores one or more formulas that the microprocessor 102 uses to obtain a current value associated with the current in the control signal 132 that is supplied to the stir motor 128 based on a duty cycle value obtained at 316. The memory 108 also stores one or more formulas that the microprocessor 102 uses to obtain a torque value based on the current value associated with current in the control signal 132 supplied to the stir motor 128. In addition, the memory 108 stores one or more formulas that the microprocessor 102 uses to obtain the second viscosity value (e.g., actual viscosity value) associated with the fluid in the tank 160 based on the torque value.

After the at least one first viscosity value and the second viscosity value are obtained, the microprocessor 102 determines whether the fluid is deteriorated based on a result of comparing the at least one first viscosity value and the second viscosity value. For example, the microprocessor 102 determines whether the fluid is deteriorated by determining whether the actual viscosity of the fluid (second viscosity value) is within a range defined by lower and upper range values (first viscosity values). One or more formula-driven algorithms may alternatively be used to determine whether the fluid is deteriorated based on a determined viscosity of the fluid and calculated lower and upper range values for the viscosity of the fluid at the temperature of the fluid in the tank 160.

In one or more embodiments, the memory 108 stores a plurality of tables or other suitable data structures that associates a plurality of actual viscosity values with a plurality of corresponding actual speed values, wherein each table or data structure is associated with a different power level value. Alternatively, one or more formulas are stored in the memory 108 and used to associate viscosity values with corresponding speed values for the stir motor 128. In one or more embodiments, the memory 108 also stores instructions that cause the microprocessor 102 to select one of the tables or data structures that is associated with a power level value that most closely matches the power level value obtained at 316. The microprocessor 102 then obtains from the selected table or data structure an actual viscosity value that is associated with an actual speed value that most closely matches the actual speed of the stir motor 128, based on the indication of the actual speed obtained at 314. The microprocessor 102 then compares the obtained actual viscosity value and the obtained lower and upper range values. If the actual viscosity value is less than the lower range value or greater than the upper range value, the microprocessor 102 determines that the fluid is deteriorated. In other words, if the actual viscosity value is not within a range that is defined by the lower and the upper range values, the microprocessor 102 determines that the fluid is deteriorated. If the actual viscosity value is greater than or equal to the lower range value and less than or equal to the upper range value, the microprocessor 102 determines that the fluid is not deteriorated. In other words, if the actual viscosity value is within the range defined by the lower and the upper range values, the microprocessor 102 determines that the fluid is not deteriorated.

In one or more embodiments, the memory 108 stores a plurality of tables or other suitable data structures that associates a plurality viscosity threshold values with a plurality of corresponding temperature values, wherein each table or data structure is associated with a different fluid type value. The memory 108 also stores instructions that cause the microprocessor 102 to determine whether the fluid in the tank 160 is deteriorated based on the indication of the fluid type obtained at 304, the indication of the temperature of the fluid obtained at 310, the power level value obtained at 316, and the indication of the actual speed obtained at 314. The microprocessor 102 selects one of the tables or data structures that is associated with the type of fluid in the tank 160, based on the indication of the fluid type obtained at 304. The microprocessor 102 obtains from the selected table or data structure a first viscosity value, for example, a viscosity threshold value that is associated with a temperature value that most closely matches the temperature of the fluid in the tank 160, based on the indication of the temperature of the fluid obtained at 310. The microprocessor 102 then determines a second viscosity value, for example, the actual viscosity of the fluid in the tank 160 based on the power level value obtained at 316 and the indication of the actual speed obtained at 314, and determines whether the fluid is deteriorated based on a result of comparing the first viscosity value and the second viscosity value. For example, if the actual viscosity of the fluid is greater than the obtained viscosity threshold value, the microprocessor 102 determines that the fluid is deteriorated at 320; if not, the microprocessor 102 does not determine that the fluid is deteriorated at 320.

If a determination is made at 320 that the fluid in the tank 160 is deteriorated, the method 300 proceeds to 322. If a determination is made at 320 that the fluid in the tank 160 is not deteriorated, the method 300 proceeds to 324.

At 322, an operator is alerted that the fluid in the tank 160 has deteriorated to a point where it should be replaced. In one or more embodiments, the memory 108 stores instructions that cause the microprocessor 102 to generate a control signal that causes a LED included in the I/O circuitry 110 to emit light and/or a speaker included in the I/O circuitry 110 to emit sound. In one or more embodiments, the memory 108 stores instructions that, when executed, cause the microprocessor 102 to display a message indicating the fluid in the tank 160 is deteriorated and/or should be replaced. In one or more embodiments, the memory 108 stores instructions that cause the microprocessor 102 to transmit a message indicating the fluid in the tank 160 is deteriorated and/or should be replaced, for example, from a USB interface included in the I/O circuitry 110. In one or more embodiments, the memory 108 stores instructions that cause the microprocessor 102 to store in the memory 108 a predetermined error code indicating the fluid in the tank 160 is deteriorated and/or should be replaced. In addition, the microprocessor 102 may generate an interrupt code or signal, which causes the method 300 to end, as explained below.

In one or more embodiments, the memory 108 stores instructions that, when executed, cause the microprocessor 102 to at least partially disable the calibration device 100 at 322 until the microprocessor 102 receives an indication that the fluid has been replaced. For example, if a determination is made at 320 that the fluid is deteriorated, the microprocessor 102 may at least partially disable the calibration device 100 by assigning a first predetermined value (e.g., "0") to a variable stored in the memory 108. In addition, the memory 108 stores instructions that cause the microprocessor 102 to check the value of the variable prior to operating the heater circuit 122 and/or the stir motor 128 and, if the variable has the first predetermined value, the microprocessor 102 does not generate control signals that cause the heater circuit 122 and/or the stir motor 128 to operate. Subsequently, after the fluid has been replaced, an operator may provide input via the control panel 140 that causes the variable stored by the memory 108 to have a second predetermined value (e.g., "1"). The instructions stored by the memory 108 may cause the microprocessor 102 to check the value of the variable prior to operating the heater circuit 122 and/or the stir motor 128 and, if the variable has the second predetermined value, the microprocessor 102 generates control signals that cause the heater circuit 122 and/or the stir motor 128 to operate.

Because the operator is alerted that the fluid in the tank 160 should be replaced before the fluid has deteriorated to the point where it polymerizes, for example, the operator can change the fluid before it become useless for calibrating thermal devices and before it becomes extremely difficult to remove from the tank 160, which is an improvement over conventional baths that do not provide an alert indicating that calibration bath fluid is deteriorated and/or should be replaced. After the operator is alerted at 322 that the fluid is deteriorated, the method 300 then returns to 310 and actions 310-318 are repeated.

At 324, a determination is made regarding whether an interrupt has been generated. For example, the microprocessor 102 checks the value of a predetermined variable or a voltage level of a predetermined terminal and determines whether the value of the variable or the voltage level of the terminal has a predetermined value. The interrupt may be generated when an operator manipulates one or more buttons on the control panel 140 to initiate a procedure for shutting down the calibration device 100, for example. If a determination is made at 324 that an interrupt has not been generated, the method 300 returns to 310, and the actions 310-324 are repeated. Accordingly, if the temperature of the fluid subsequently changes, the viscosity of the fluid changes and a corresponding change is made to the power level of the control signal 132, thereby changing the speed at which the stir motor 128 rotates. If a determination is made at 324 that an interrupt has been generated, the method 300 proceeds to 326, where the method 300 ends.

The calibration device 100 performing the method 300 provides an improvement over conventional calibration baths. Conventional calibration baths do not control the speed at which fluids are stirred. Instead, they include stir motors that are either turned on or turned off. When the calibration device 100 performs the method 300, the calibration device 100 uses closed-loop control to keep the stir motor 128 spinning at a more constant and proper speed over a range of fluid viscosities as compared to conventional calibration devices. Accordingly, the calibration device 100 performing the method 300 achieves better temperature uniformity and temperature stability of a fluid used to perform calibration of thermal devices, as compared to conventional calibration baths.

The various embodiments described above can be combined to provide further embodiments. Although the example embodiments have been described in the context of a high-temperature calibration bath, the present disclosure is applicable to low-temperature calibration baths. For example, the heater circuit 122 can be replaced with a circuit that cools a fluid disposed within the tank 160, and the microprocessor 102 can control the fan 188 to move ambient air into the conduit 178 to add heat to the fluid disposed within the tank 160. In addition, the fan 188 may be replaced by a pump having a motor that is coupled to an impeller, one or more pistons, one or more plungers, or one or more diaphragms. Additionally, the microprocessor 102 may control a speed at which the pump motor rotates based input received from one or more of the temperature sensors 124, in a manner that is similar to the above-described manner in which the microprocessor 102 controls a speed at which the fan motor 114 rotates.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
 a tank;
 a propeller disposed within the tank;
 a motor coupled to the propeller;
 a processor coupled to the motor; and
 a memory storing instructions that, when executed by the processor, cause the motor to:
 rotate at a specified speed based on a signal received from the motor indicating an actual speed at which the motor is rotating;
 obtain a first viscosity value of a fluid in the tank;
 obtain a second viscosity value of the fluid in the tank based on a power level value associated with a control signal that is provided to the motor;

compare the first viscosity value and the second viscosity value;
determine that the fluid in the tank is deteriorated based on a result of comparing the first viscosity value and the second viscosity value; and
provide an operator alert that the fluid is deteriorated in response to determining that the fluid is deteriorated.

2. The device of claim 1, wherein the memory stores instructions that, when executed by the processor, cause the device to:
obtain an indication of a first temperature of a fluid in the tank;
obtain the first viscosity value based on the first temperature of the fluid;
obtain a first power level value based on the first viscosity value; and
generate a first control signal based on the first power level value, the first control signal being supplied to the motor.

3. The device of claim 2, wherein the memory stores instructions that, when executed by the processor, cause the device to:
obtain an indication of a fluid type of the fluid; and
obtain the first viscosity value based on the fluid type and the first temperature of the fluid.

4. The device of claim 2, wherein the memory stores instructions that, when executed by the processor, cause the device to:
obtain an indication of a second temperature of the fluid;
obtain the second viscosity value based on the second temperature of the fluid;
obtain a second power level value based on the second viscosity value; and
generate a second control signal based on the second power level value, the second control signal being supplied to the motor.

5. The device of claim 4, wherein the memory stores instructions that, when executed by the processor, cause the device to:
obtain an indication of a fluid type of the fluid;
obtain the first viscosity value based on the fluid type and the first temperature of the fluid; and
obtain the second viscosity value based on the fluid type and the second temperature of the fluid.

6. The device of claim 1, wherein the memory stores instructions that, when executed by the processor, cause the device to:
obtain s signal indicating the actual speed at which the motor is rotating;
obtain a power level value based on the actual speed at which the propeller is rotating; and
generate a control signal based on the power level value, the control signal being supplied to the motor.

7. The device of claim 1, wherein the memory stores instructions that, when executed by the processor, cause the device to provide the operator alert by causing the device to at least one of:
emit sound;
emit light;
display a message;
transmit a message from the device; and
store an error code in the memory.

8. The device of claim 1, wherein the memory stores instructions that, when executed by the processor, cause the device to:
in response to determining that the fluid is deteriorated, at least partially disable the device until an indication that the fluid has been replaced is received.

9. The device of claim 1, wherein the memory stores instructions that, when executed by the processor, cause the device to:
obtain an indication of a temperature of the fluid;
obtain an indication of a fluid type of the fluid; and
obtain the first viscosity value based on the temperature and the fluid type of the fluid.

10. The device of claim 1, wherein the memory stores instructions that, when executed by the processor, cause the device to:
obtain an indication of a desired depth of a fluid in the tank;
obtain a power level value based on the desired depth of the fluid in the tank; and
generate a control signal based on the power level value, the control signal being supplied to the motor.

11. A method, comprising:
obtaining an indication of a first temperature of a fluid disposed within a tank;
obtaining a first power level value associated with a first control signal that is provided to a stir motor based on the first temperature of the fluid disposed within the tank;
generating the first control signal based on the first power level value;
providing the first control signal to the stir motor, the stir motor being coupled to a propeller disposed within the tank, the first control signal causing the stir motor to rotate at a first speed;
obtaining an indication of a second temperature of the fluid disposed within the tank;
obtaining a second power level value associated with a second control signal that is provided to the stir motor based on the second temperature of the fluid disposed within the tank;
generating the second control signal based on the second power level value;
providing the second control signal to the stir motor, the second control signal causing the stir motor to rotate at a second speed, the second speed being different from the first speed;
obtaining a first viscosity value of the fluid in the tank;
obtaining a second viscosity value of the fluid in the tank based on the second power level value;
comparing the first viscosity value and the second viscosity value;
determining that the fluid is deteriorated based on a result of the comparing of the first viscosity value and the second viscosity value; and
providing an operator alert that the fluid is deteriorated in response to determining that the fluid is deteriorated.

12. The method of claim 11, further comprising:
obtaining the first viscosity value based on the first temperature of the fluid; and
obtaining the second viscosity value based on the second temperature of the fluid,
wherein the obtaining of the first power level value includes obtaining the first power level value based on the first temperature of the fluid and the first viscosity value, and
wherein the obtaining of the second power level value includes obtaining the second power level value based on the second temperature of the fluid and the second viscosity value.

13. The method of claim 12, further comprising:
obtaining an indication of a fluid type of the fluid,
wherein the obtaining of the first viscosity includes obtaining the first viscosity value based on the first temperature and the fluid type of the fluid, and
wherein the obtaining of the second viscosity includes obtaining the second viscosity value based on the second temperature and the fluid type of the fluid.

14. The method of claim 11, further comprising:
obtaining a first indication of a first speed at which the stir motor is rotating; and
obtaining a second indication of a second speed at which the stir motor is rotating,
wherein the obtaining of the first power level value is based on the first speed at which the stir motor is rotating and the first temperature of the fluid disposed within the tank; and
wherein the obtaining of the second power level value is based on the second speed at which the stir motor is rotating and the second temperature of the fluid disposed within the tank.

15. The method of claim 12, wherein the providing of the operator alert includes at least one of:
emitting light;
emitting sound;
displaying a message;
transmitting a message from the device; and
storing an error code in a memory.

16. The method of claim 11, further comprising:
obtaining an indication of a fluid type of the fluid,
wherein the obtaining of the first viscosity value includes obtaining the first viscosity value based on the fluid type.

17. The method of claim 11, further comprising:
in response to determining that the fluid is deteriorated, at least partially disabling the device until an indication that the fluid has been replaced is received.

18. The method of claim 11, further comprising:
obtaining an indication of a desired depth of a fluid in the tank,
wherein the obtaining the of first power level value includes obtaining the first power level value based on the first temperature of the fluid and the desired depth of the fluid in the tank.

* * * * *